(12) United States Patent
Rose et al.

(10) Patent No.: US 10,921,414 B2
(45) Date of Patent: Feb. 16, 2021

(54) TRACKING RECEIVER WITH INTEGRATED PHASE CALIBRATION AND METHOD

(71) Applicant: VIASAT, INC., Carlsbad, CA (US)

(72) Inventors: Christopher A Rose, Braselton, GA (US); Brian D Chandler, Atlanta, GA (US); David E Sinyard, Sugar Hill, GA (US); Charles M Luke, Cumming, GA (US)

(73) Assignee: Viasat, Inc., Carlsbad, CA (US)

( * ) Notice: Subject to any disclaimer, the term of this patent is extended or adjusted under 35 U.S.C. 154(b) by 154 days.

(21) Appl. No.: 16/209,737

(22) Filed: Dec. 4, 2018

(65) Prior Publication Data

US 2019/0170846 A1 Jun. 6, 2019

Related U.S. Application Data

(60) Provisional application No. 62/594,447, filed on Dec. 4, 2017.

(51) Int. Cl.
*G01S 3/48* (2006.01)
*G01S 3/02* (2006.01)

(52) U.S. Cl.
CPC ............. *G01S 3/023* (2013.01); *G01S 3/48* (2013.01)

(58) Field of Classification Search
CPC . G01S 3/023; G01S 3/48; G01S 19/24; G01S 19/14; G01S 19/32; H01Q 1/1257; G01C 15/00
USPC ........................................................ 342/352
See application file for complete search history.

(56) References Cited

U.S. PATENT DOCUMENTS

| 2004/0152434 A1* | 8/2004 | Peterson, III | H03J 1/0075 455/196.1 |
| 2014/0168006 A1* | 6/2014 | Sickinger | G01S 7/40 342/147 |

* cited by examiner

*Primary Examiner* — Harry K Liu
(74) *Attorney, Agent, or Firm* — Holland & Hart LLP (57) ABSTRACT

A system and method of the disclosure relates to satellite tracking. The system may comprise a tracking receiver that includes a first analog-to-digital (A/D) converter coupled between a sum input and a digital signal processor (DSP), a second A/D converter coupled between a difference input and the DSP, and a calibration output coupled to the sum input and coupled to the difference input. The first A/D converter may convert an signal received at the sum input into a sum digital signal, and provide the sum digital signal to the DSP. The second A/D converter may convert an signal received at the difference input into a difference digital signal, and provide the difference digital signal to the DSP. The tracking receiver may generate an calibration signal and provide the calibration signal through the calibration output.

28 Claims, 5 Drawing Sheets

TRACKING RECEIVER WITH INTEGRATED PHASE CALIBRATION AND METHOD

CROSS-REFERENCE TO RELATED APPLICATION

This application claims the benefit of U.S. Provisional Application No. 62/594,447, filed Dec. 4, 2017, which application is incorporated herein by reference.

BACKGROUND

Field

The present disclosure relates generally to a tracking system with integrated phase calibration for use with a radio frequency directional antenna assembly.

Background

Existing satellite tracking systems use a labor intensive phase matching process between multiple radio frequency (rf) paths. For example, rf cables are trimmed in length, and manual phase shifters are adjusted in the field after deployment. Further, low-noise amplifiers used in the rf paths must be matched to a reference.

In addition, long (and expensive) rf cables run alongside the antenna for providing tracking signals. The cables may be damaged in the field.

There is therefore a need for a technique for eliminating requirements for phase matched components, manual phase shifters/adjustments, or labor intensive rf cable trimming.

SUMMARY

An aspect of the present disclosure may reside in a system for tracking a satellite. The system may comprise a tracking receiver including a sum input, a difference input, a digital signal processor (DSP), a first analog-to-digital (A/D) converter, and a second A/D converter. The first A/D converter may be coupled between the sum input and the DSP. The first A/D converter may be configured to convert a signal received at the sum input into a sum digital signal, and to provide the sum digital signal to the DSP. The second A/D converter may be coupled between the difference input and the DSP. The second A/D converter may be configured to convert a signal received at the difference input into a difference digital signal, and to provide the difference digital signal to the DSP. The calibration output may be coupled to the sum input and coupled to the difference input. The tracking receiver may be configured to generate a calibration signal and provide the calibration signal through the calibration output.

In more detailed aspects of the disclosure, the DSP may be configured to generate a phase correction value based on the sum digital signal and the difference digital signal resulting from the calibration signal coupled to the sum input and coupled to the difference input. The DSP may be further configured to store the phase correction value. The phase correction value may correspond to a phase difference between the sum digital signal and the difference digital signal. A first calibration signal insertion component may be coupled between the calibration output and the sum input, and may define a first signal path between the first calibration signal insertion component and the sum input. A second calibration signal insertion component may be coupled between the calibration output and the difference input, and may define a second signal path between the second calibration signal insertion component and the sum input. The first signal path and the second signal path may have different phase shifts. The DSP may be configured to generate a phase correction value based on a phase difference between the first signal path and the second signal path.

In other more detailed aspects of the disclosure, the first calibration signal insertion component may comprise a first coupler, and the second calibration signal insertion component may comprise a second coupler. The first coupler may have a first antenna signal input, a first calibration signal input, and a first coupled signal output. The first calibration signal input may be coupled to the calibration output, and the first coupled signal output may be coupled to the sum input. The second coupler may have a second antenna signal input, a second calibration signal input, and a second coupled signal output. The second calibration signal input may be coupled to the calibration output, and the second coupled signal output may be coupled to the difference input.

A first amplifier may be coupled between the first coupled signal output and the sum input, and a second amplifier may be coupled between the second coupled signal output and the difference input. Likewise, a first mixer may be coupled between the first coupled signal output and the sum input, and a second mixer may be coupled between the second coupled signal output and the difference input. A data antenna may be coupled to the first antenna signal input and configured to generate a sum signal, and an offset antenna may be coupled to the second antenna signal input and configured to generate a difference signal.

In other more detailed aspects of the disclosure, the first calibration signal insertion component may comprise a first switch, and the second calibration signal insertion component may comprise a second switch. The first switch may have a first antenna signal input, a first calibration signal input, and a first switched signal output. The first calibration signal input may be coupled to the calibration output, and the first switched signal output may be coupled to the sum input. The second switch may have a second antenna signal input, a second calibration signal input, and a second switched signal output. The second calibration signal input may be coupled to the calibration output, and the second switched signal output may be coupled to the difference input.

The system may further comprise an antenna assembly configured to generate an antenna sum signal at a sum output, and an antenna difference signal at a difference output. The sum output may be coupled to the sum input, and the difference output may be coupled to the difference input. The antenna assembly may include a TE21 coupler having the sum output and the difference output.

In other more detailed aspects of the disclosure, the DSP may be configured to generate a tracking signal for moving the antenna assembly and to store a phase correction value generated using the calibration signal. The tracking signal may be generated based on the phase correction value, and a source signal received from a target satellite using the antenna assembly to generate the antenna sum signal and to generate the antenna difference signal. The tracking receiver may be attached to the antenna assembly such that the tracking receiver moves with the antenna assembly. The antenna assembly may have a feed assembly and a reflector, and the tracking receiver may be housed within a can of the feed assembly.

The DSP may be further configured to store a second phase correction value, The second phase correction value may be associated with a phase difference between a first signal path through the antenna assembly to the sum output and a second signal path through the antenna assembly to the difference output.

Another aspect of the disclosure may reside in a phase calibration method. In the method, a first calibration signal from an calibration output of a tracking receiver may be received at a sum input of the tracking receiver, and a second calibration signal from the calibration output may be received at a difference input of the tracking receiver. The first calibration signal may be converted into a sum digital signal, and the second calibration signal may be converted into a difference digital signal. A phase correction value may be generated based on the sum digital signal and the difference digital signal.

In more detailed aspects, the sum input may be coupled to a sum output of an antenna assembly, and the difference input may be coupled to a difference output of the antenna assembly. The phase correction value may be based on a phase difference between a first path from the sum output to the sum input and a second path from the difference output and the difference input. A tracking signal may be generated based on the phase correction value, and a source signal received from a target satellite using a data antenna to generate an antenna sum signal and an offset antenna to generate an antenna difference signal As one example, the antenna assembly may include the data antenna that may generate a sum signal at the sum output, and may include the offset antenna that may generate a difference signal at the difference output. Alternatively, the antenna assembly may include a TE21 coupler that may generate the sum signal at the sum output and the difference signal at the difference output.

DETAILED DESCRIPTION

Figure 1:
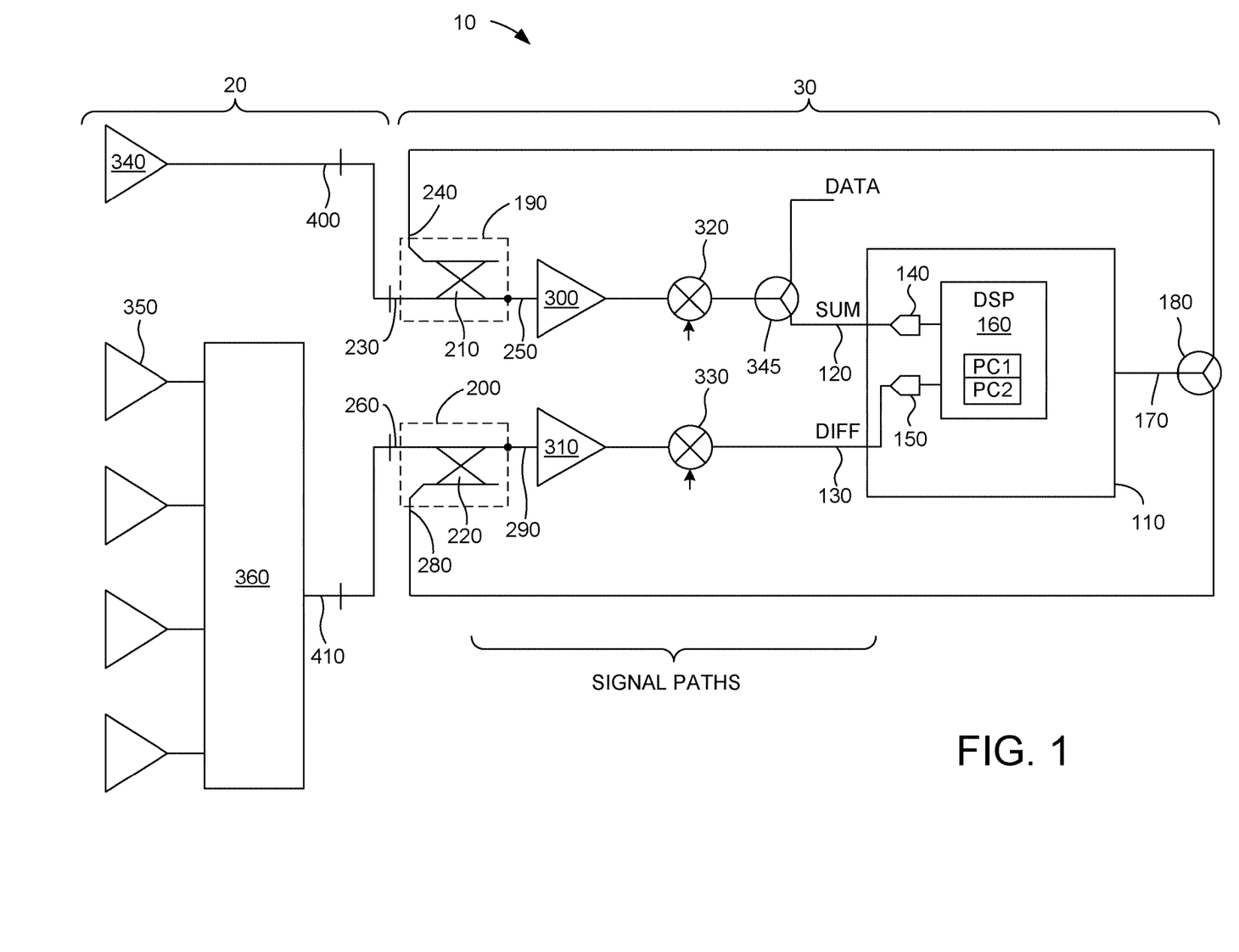
FIG. 1 is a block diagram of an example of a satellite tracking system having a tracking receiver.
Figure 2:
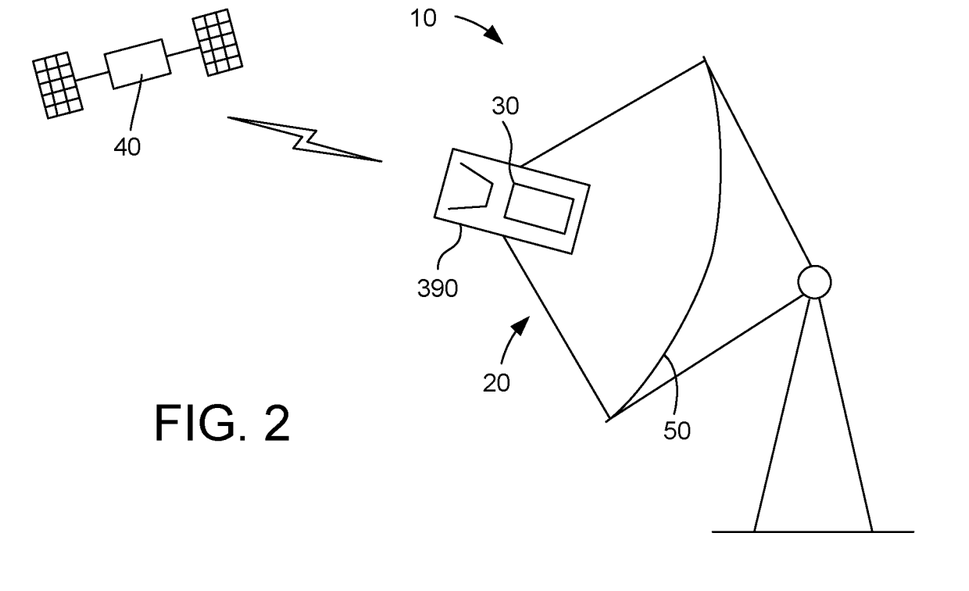
FIG. 2 is a schematic diagram of an example of a satellite tracking system having an antenna assembly with an integrated tracking receiver.

With reference to FIGS. 1 and 2, a tracking system 10 may have an antenna assembly 20 and a tracking assembly 30 for tracking a satellite 40 (or similar space traveling object) in order to receive signals from the satellite 40 and to transmit signals to the satellite. The tracking may be performed by receiving signals in the S-band, X-band, Ka-band, and similar signal bands. The antenna assembly 20 may be ground mounted and may include a parabolic reflector 50 having, as an example, a diameter from about 5 meters to about 13 meters. The antenna assembly 20 may provide a sum signal and a difference signal for use in the tracking.

The tracking system 10 may require calibration of phase differences in the signal paths of the sum and difference signals through the antenna assembly 20 and the tracking receiver 30. Initial phase calibration may be performed in connection with the installation and setup of the tracking system 10. For example, a phase offset calibration of the antenna assembly 20 may be performed by a one-time calibration performed without the parabolic reflector 50, at a mid-range temperature.

The antenna assembly 20 may be coupled to the tracking assembly 30 at or near calibration signal insertion components, 190 and 200. The phase offset (or phase difference) of the signal paths/channels in the tracking assembly 30 may be determined by tracking receiver 110 using inserted calibration signals. The tracking receiver 110 may have a tracking mode of operation and a calibration mode of operation. The tracking assembly 30 may have aspects that support the calibration mode.

As an example, the tracking receiver 110 may include a sum input 120, a difference input 130, a first analog-to-digital (A/D) converter 140, a second A/D converter 150, a digital signal processor (DSP) 160, and calibration output 170. The first A/D converter 140 may be coupled between the sum input 120 and the DSP 160. The first A/D converter 140 may be configured to convert a signal received at the sum input 120 into a sum digital signal, and to provide the sum digital signal to the DSP 160. The second A/D converter 150 may be coupled between the difference input 130 and the DSP 160. The second A/D converter 150 may be configured to convert a signal received at the difference input 130 into a difference digital signal, and to provide the difference digital signal to the DSP 160. The calibration output 170 may be coupled to the sum input 120 and coupled to the difference input 130. The tracking receiver 110 may be configured to generate a calibration signal and provide the calibration signal through the calibration output 170. An output splitter 180 may split the calibration signal.

In more detailed aspects of the disclosure, the DSP 160 may be configured to generate a phase correction value PC1 based on the sum digital signal and the difference digital signal resulting from the calibration signal coupled to the sum input 120 and coupled to the difference input 130. The DSP 160 may be further configured to store the phase correction value. The phase correction value may correspond to a phase difference between the sum digital signal and the difference digital signal. A first calibration signal insertion component 190 may be coupled between the calibration output 170 and the sum input 120, and may define a first signal path between the sum input 120 and the first calibration signal insertion component 190. A second calibration signal insertion component 200 may be coupled between the calibration output 170 and the difference input 130, and may define a second signal path between the difference input 130 and the second calibration signal insertion component 200. The first signal path and the second signal path may have different phase shifts due to one or more components along the respective signal paths. The DSP 160 may be configured to generate a phase correction value (e.g., PC1) based on a phase difference between the first signal path and the second signal path in response to the calibration signal.

In the illustrated example, the first calibration signal insertion component 190 may comprise a first coupler 210, and the second calibration signal insertion component 200 may comprise a second coupler 220. The first coupler 210 may have a first antenna signal input 230, a first calibration signal input 240, and a first coupled signal output 250. The first calibration signal input 240 may be coupled to the calibration output 170, and the first coupled signal output may be coupled to the sum input 120. The second coupler 220 may have a second antenna signal input 260, a second calibration signal input 280, and a second coupled signal output 290. The second calibration signal input 260 may be coupled to the calibration output 170, and the second coupled signal output 290 may be coupled to the difference input 130. The first coupler 210 and the second coupler 220 may be directional couplers.

A first amplifier 300 may be coupled between the first coupled signal output 250 and the sum input 120, and a second amplifier 310 may be coupled between the second coupled signal output 290 and the difference input 130. Likewise, a first mixer 320 may be coupled between the first coupled signal output 250 and the sum input 120, and a second mixer 330 may be coupled between the second coupled signal output 290 and the difference input 130.

In the illustrated example, the antenna assembly 20 includes a data antenna 340 and one or more offset antennas 350. Alternatively, the antenna assembly 20 may be different. The antenna assembly 20 may be coupled to the first antenna signal input 230 and may generate a sum signal. A splitter 345 may split the signal from the data antenna 340 to provide a data signal DATA. The antenna assembly 20 may be coupled to the second antenna signal input 260 and may generate a difference signal.

Figure 3:
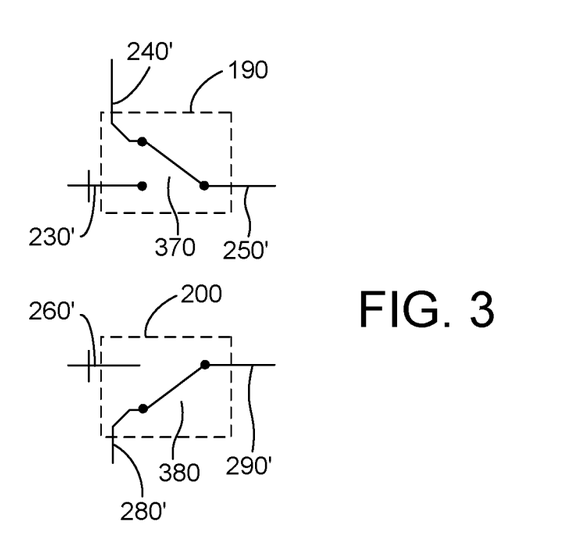
FIG. 3 is a block diagram of an example of switches for coupling a calibration signal.

With further reference to FIG. 3, in another example, the first calibration signal insertion component 190 may comprise a first switch 370, and the second calibration signal insertion component 200 may comprise a second switch 380. The first switch 370 may have a first antenna signal input 230', a first calibration signal input 240', and a first switched signal output 250'. The first calibration signal input 240' may be coupled to the calibration output 170, and the first switched signal output 250' may be coupled to the sum input 120. The second switch 380 may have a second antenna signal input 260', a second calibration signal input 280', and a second switched signal output 290'. The second calibration signal input 260' may be coupled to the calibration output 170, and the second switched signal output 290' may be coupled to the difference input 130.

Figure 4:
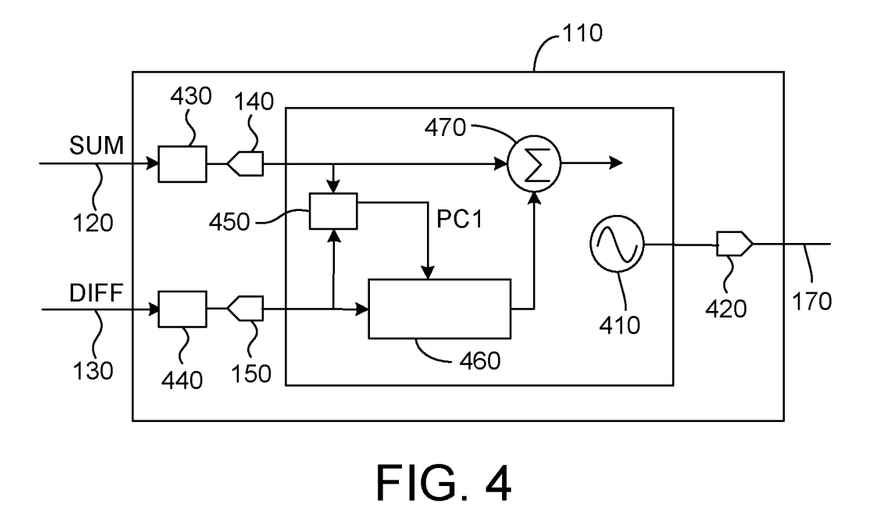
FIG. 4 is a block diagram of an example of a tracking receiver that provides a calibration signal.

With reference to FIG. 4, the calibration signal may be generated by the DSP 160 using a configurable direct digital synthesizer (DDS) 410. The DDS 410 outputs a digital calibration signal to a digital-to-analog converter (DAC) 420. The DAC 420 outputs the calibration signal, at the calibration output 170, based on the digital calibration signal. This calibration signal may also be generated with a phase-locked-loop (PLL) and a voltage-controlled oscillator (VCO) (not shown). Two voltage controlled amplifiers, 430 and 440, may set the level of the signal input into the A/D converters, 140 and 150, respectively. A differential phase detector 450 detects the phase difference (or phase offset) between the digital sum signal and the digital difference signal output by the A/D converters, 140 and 150, respectively, The differential phase detector 450 generates the phase correction value based on the detected phase difference and provides the phase correction value to a phase adjustment rotator 460. In the illustrated example, the phase adjustment rotator 460 digitally adjusts the phase of the digital difference signal in this example. More generally, the phase of the digital sum signal and/or the phase of the digital different signal may be adjusted using the phase correction value in order to phase match (or phase align) the two signals. The adjusted digital difference signal is combined with the digital sum signal by a combination/sum operation 470.

In a more detailed aspect of the disclosure, the differential phase detector 450 may use a complex conjugate multiply, and a complex integrate and dump. An instantaneous estimate of the phase offset may be calculated using the complex conjugate multiply. The sum signal may be modeled by $e^{(j\omega t+\theta_1)}$ and the difference signal may be modeled by $e^{(j\omega t+\theta_2)}$. A complex conjugate multiply may produce the following: $CC_{instant}=e^{(j\omega t+\theta_1)}*e^{-1*(j\omega t+\theta_2)}=e^{(j\omega t+\theta_1-j\omega t-\theta_2)}=e^{(\theta_1\theta_2)}$ $=\cos(\theta_1-\theta_2)-j\sin(\theta_1-\theta_2)$. This instantaneous phase estimate may be averaged using a complex integrate and dump. The values may be accumulated over $2^N$ samples, and the accumulated result may be divided by $2^N$: $CC_{ave}=(\frac{1}{2}^N)\Sigma[\cos(\theta_1-\theta_2)-j\sin(\theta_1-\theta_2)]$. The averaged complex result may be input into an arctan function to recover the phase offset value: $\Theta_{ave}=\arctan[\text{Im}(CC_{ave})/\text{Re}(CC_{ave})]\approx-(\theta_1-\theta_2)$.

The phase adjustment rotator 460 may phase rotate the digital difference signal to remove the phase offset between the sum and difference signals. The rotator 460 receives the difference digital signal and the resulting phase offset value, and outputs a phase rotated complex value.

In some embodiments, the phase calibration may be performed at multiple frequencies within the operating bandwidth of the tracking system by generating CW tones at each step, and performing the phase error calibration at each of the steps. The steps may for example be selected to correspond to a predetermined maximum value (e.g., about 20 degrees of phase difference in a worst case scenario) of phase mismatch. Thus, the steps may be selected to allow for easy interpolation between steps.

The tracking receiver 30, integrated with the feed assembly 390, may perform the phase matching of the radio frequency (rf) signal paths in the digital domain of the DSP 160 using injection of the calibration signal into the signal paths. The tracking receiver 30 may be placed inside a feed can of the feed assembly 390, and may send and receive the calibration signals to perform the phase calibration. During the tracking mode, the tracking receiver 30 also may output a tracking error signal to an Antenna Controller Unit (ACU) (not shown) via digital signals (e.g. Ethernet messages) rather than via an analog signal over expensive rf cables.

These aspects allow for reduced cost in the components of the system. Phase matched low-noise amplifiers (LNAs) are no longer required, thus allowing the use of lower cost low-noise blocks (LNBs). Az/El switch control and ACU functionality may be moved into the tracking receiver 30 thus requiring less cabling between the ACU and the tracking receiver 30. ACU functionality also may be moved to the tracking receiver, i.e., bin integration. Using the calibration to align and combine the sum and difference signals in the DSP 160 of the tracking receiver 30 provides multiple benefits. As examples, it may eliminate an external phase-shifter and coupler by creating a phaseshifter and coupler in the DSP 160. Further, it may reduce labor cost in construction of the tracking system 10. Delay and phase may be characterized, but matching may not be required between the sum and difference channels. It is much easier to characterize or measure phase than it is to physically cut cables to match phase.

The antenna assembly 20 can vary from embodiment to embodiment and may be configured to generate an antenna sum signal at a sum output 400, and an antenna difference signal at a difference output 410. The sum output may be coupled to the sum input 120, and the difference output may be coupled to the difference input 130. In the example of FIG. 1, the antenna sum signal is generated by data antenna 340 and the antenna difference signal is generated by one or more offset antennas 350 coupled to switch 360. As an alternative example, the antenna assembly 20 may include a TE21 coupler having the sum output 400 and the difference output 410.

With further reference to FIG. 2, the antenna assembly 20 may have a feed assembly 390 and a reflector 50, and the tracking assembly 30 may be housed within a can of the feed assembly 390. The DSP 160 may be configured to generate a tracking signal for moving the antenna assembly 20, and to store a phase correction value generated using the calibration signal. The tracking assembly 30 may be attached to the feed assembly 390 such that the tracking assembly 30 moves with the antenna assembly 20. During a tracking mode of operation, the tracking signal may be generated based on a stored phase correction value (e.g., PC1), and a source signal received from a target satellite 40 using the antenna assembly 20 to generate an antenna sum signal and to generate an antenna difference signal.

Figure 5:
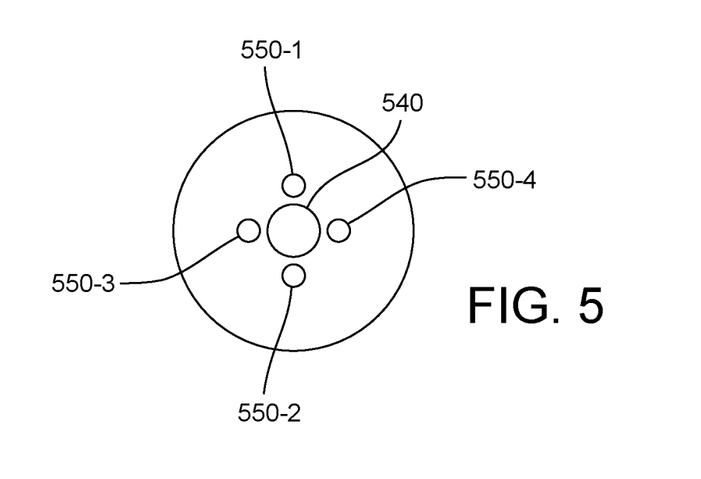
FIG. 5 is a schematic diagram of an example of an antenna assembly having a data antenna and offset antennas.

With reference to FIG. 5, the data antenna 540 may be a central feed horn, and four surrounding offset antennas 550-N may be smaller feed horns. Two of the offset antennas, 550-1 and 550-2, may be used for elevation tracking and may be positioned above and below the data antenna 540. Two of the offset antennas, 550-3 and 550-4, may be used for horizontal (azimuth) tracking, and may be positioned to the right and the left the data antenna 540. During calibration, a switch 360 may time multiplex the offset antennas 550-N such that one offset antenna at a time is connected to the second antenna signal input 260.

The data antenna 540 may be aligned to the antenna boresite while the offset antennas 550-N may be offset from boresite by a slight angle. The data antenna 540 may be used for acquiring data from the satellite 40 (or other signal source) since it has the greatest sensitivity. The sum signal from the data antenna 540 may be used to normalize the difference signals from the offset antennas 550-N in order to keep a constant error slope when a range to the satellite 40 is varying. The variation in signal due to range is common to all antennas so normalizing the difference signals to the sum signal keeps the difference path error slope constant. The signals from offset antennas 550-N are used to generate the tracking signals.

The initial calibration of the phase shift (or phase offset or delay) for the signal paths through the antenna assembly 200 may be done one time at in an indoor feed chamber (not shown). In one example, the measurement may be made at room temperature, and the amount of phase change over temperature may be estimated. This calibration may not include the reflector 50 and may need a correction for geometry effects such as parallax. The calibration may be able to align all of the difference paths of the offset antennas 550-N, but it may not be able to align with the sum path of the data antenna 340 because of different path lengths between the data antenna and the offset antennas.

The DSP 160 may be further configured to store another phase correction value PC2. This phase correction value may be associated with a phase difference between a first signal path through the antenna assembly 20 to the sum output 400 and a second signal path through the antenna assembly 30 to the difference output 410.

Figure 6:
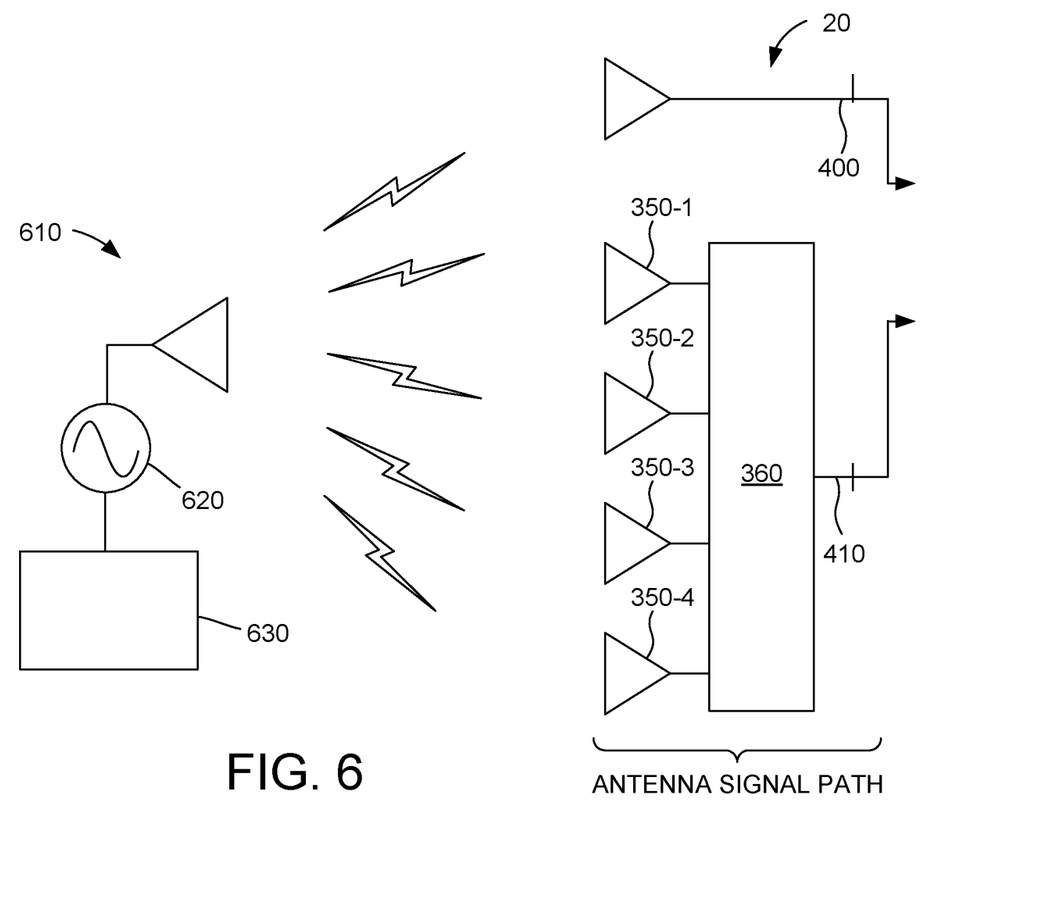
FIG. 6 is a schematic diagram of an example of an external source for calibrating a phase shift of an antenna assembly.

With reference to FIG. 6, a boresite calibration may be performed to calibrate the antenna assembly 20. No parallax correction is required in this example since the calibration is being performed in the far-field. The source may be a boresite tower 610 having a microwave source 620 and gps accurate 10 MHz reference 630.

The reflector 430 may be included in the calibration. The antenna assembly 20 may be positioned or pointed offset from the boresight to revolve phase ambiguities and to give an adequate signal for the subject difference channel. Note that the temperature may not be in the center of the temperature range because it may take place outdoors. Alternately, the source may be a satellite 40. Note that the calibration time may impact the data path when the antenna assembly 20 is off of boresight.

The phase calibration of the tracking receiver 30 may be closed loop, and may determine a phase shift between the signal paths between, for example, the couplers, 210 and 220, and the A/D converters, 140 and 150, respectively. The calibration may require the tracking receiver 30 to be taken offline. If a new LNA is installed in the field, the closed-loop calibration may be performed to calibrate the new phase shift.

During tracking mode, the manner in which processing is performed by the DSP can be different for different types of feeds. In an antenna assembly 20 having a TE21 coupler, the phase states are 0, 90, 180, 270. There is no switching as the Azumith/Elevation separation is done by TE21 quadrature orthogonality between the Az/El. For linear polarization with a rotating feed, a coordinate transformation between Az/El of feed and Az/El of servo system is performed. For monoscan, the phase states are 0, 180. Switching between Az and El paths is preformed by two switch input, and phase matching to 180 deg hybrid in Az or El is used. For EScan, the signal is amplitude only but the sum and diff signals are phase aligned. The switching is between four antennas based on four switch inputs.

Figure 7:
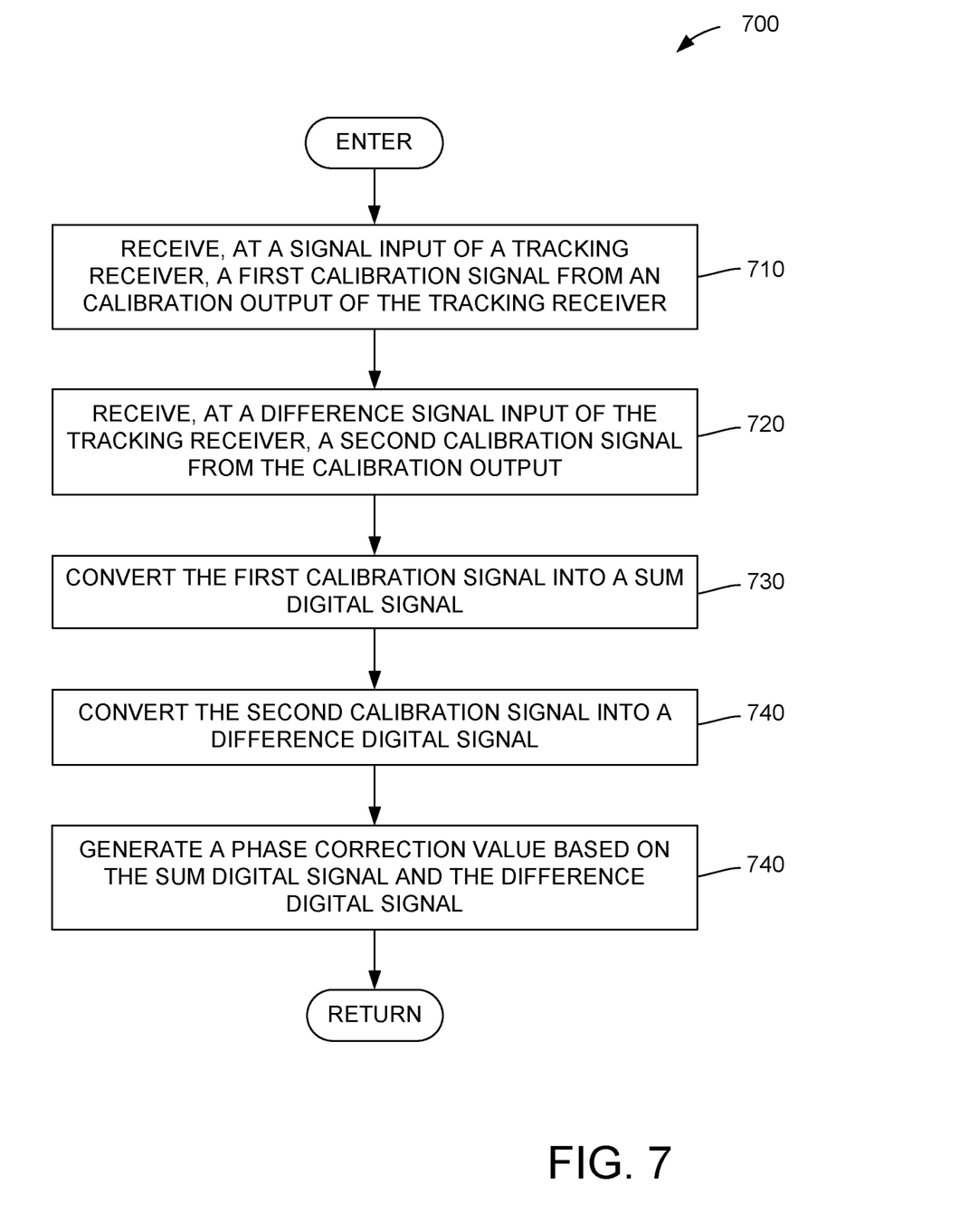
FIG. 7 is a flow diagram of an example of a method for phase calibration in a tracking receiver.

With reference to FIG. 7, another aspect of the disclosure may reside in a phase calibration method 700. In the method 700, a first calibration signal from an calibration output of a tracking receiver 30 may be received at a sum input 120 of the tracking receiver 30, and a second calibration signal from the calibration output may be received at a difference input 130 of the tracking receiver. The first calibration signal may be converted into a sum digital signal, and the second calibration signal may be converted into a difference digital signal. A phase correction value may be generated based on the sum digital signal and the difference digital signal.

In more detailed aspects, the sum input 120 may be coupled to a sum output 400 of an antenna assembly 20, and the difference input 130 may be coupled to a difference output 410 of the antenna assembly 20. The phase correction value may be based on a phase difference between a first signal path from the sum output 400 to the sum input 120 and a second signal path from the difference output 410 and the difference input 130 resulting from the calibration signal. A tracking signal may be generated based on the phase correction value, and a source signal received from a target satellite 40 (or other signal source) by the antenna assembly 20 to generate an antenna sum signal an antenna difference signal.

As one example, the antenna assembly 20 may include the data antenna 340 that may generate an antenna sum signal at the sum output 400, and may include the offset antenna 350 that may generate an antenna difference signal at the difference output 410. As another example, the antenna assembly 20 may include a TE21 coupler that may generate the antenna sum signal at the sum output 400 and the antenna difference signal at the difference output 410.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. The code may be executed by the processor of the computer. Computer-readable media includes both non-transitory computer-readable storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system for tracking a satellite, comprising:
a tracking receiver, including:
a sum input;
a difference input;
a digital signal processor (DSP);
a first analog-to-digital (A/D) converter coupled between the sum input and the DSP, wherein the first A/D converter is configured to convert a signal received at the sum input into a sum digital signal, and to provide the sum digital signal to the DSP;
a second A/D converter coupled between the difference input and the DSP, wherein the second A/D converter is configured to convert a signal received at the difference input into a difference digital signal, and to provide the difference digital signal to the DSP; and
a calibration output coupled to the sum input and coupled to the difference input; wherein the tracking receiver is configured to generate a calibration signal and provide the calibration signal through the calibration output.

2. The system of claim 1, wherein the DSP is configured to:
generate a phase correction value based on the sum digital signal and the difference digital signal resulting from the calibration signal coupled to the sum input and coupled to the difference input; and
store the phase correction value.

3. The system of claim 2, wherein the phase correction value corresponds to a phase difference between the sum digital signal and the difference digital signal.

4. The system of claim 1, further comprising:
a first calibration signal insertion component coupled between the calibration output and the sum input, and defining a first signal path between the first calibration signal insertion component and the sum input; and a second calibration signal insertion component coupled between the calibration output and the difference input, and defining a second signal path between the second calibration signal insertion component and the sum input.

5. The system of claim 4, wherein the first signal path and the second signal path have different phase shifts.

6. The system of claim 4, wherein the DSP is configured to generate a phase correction value based on a phase difference between the first signal path and the second signal path.

7. The system of claim 4, wherein:
the first calibration signal insertion component comprises a first coupler having a first antenna signal input, a first calibration signal input, and a first coupled signal output, wherein the first calibration signal input is coupled to the calibration output, and the first coupled signal output is coupled to the sum input; and
the second calibration signal insertion component comprises a second coupler having a second antenna signal input, a second calibration signal input, and a second coupled signal output, wherein the second calibration signal input is coupled to the calibration output, and the second coupled signal output is coupled to the difference input.

8. The system of claim 4, further comprising:
a first amplifier along the first signal path; and
a second amplifier along the second signal path.

9. The system of claim 4, further comprising:
a first mixer along the first signal path; and
a second mixer along the second signal path.

10. The system of claim 7, further comprising:
a data antenna coupled to the first antenna signal input and configured to generate a sum signal; and
an offset antenna coupled to the second antenna signal input and configured to generate a difference signal.

11. The system of claim 4, wherein:
the first calibration signal insertion component comprises a first switch having a first antenna signal input, a first calibration signal input, and a first switched signal output, wherein the first calibration signal input is coupled to the calibration output, and the first switched signal output is coupled to the sum input; and
the second calibration signal insertion component comprises a second switch having a second antenna signal input, a second calibration signal input, and a second switched signal output, wherein the second calibration signal input is coupled to the calibration output, and the second switched signal output is coupled to the difference input.

12. The system of claim 1, further comprising:
an antenna assembly configured to generate an antenna sum signal at a sum output, and an antenna difference signal at a difference output, wherein the sum output is coupled to the sum input, and the difference output is coupled to the difference input.

13. The system of claim 12, wherein the antenna assembly includes a TE21 coupler having the sum output and the difference output.

14. The system of claim 12, wherein:
the DSP is configured to generate a tracking signal for moving the antenna assembly and to store a phase correction value generated using the calibration signal; and
the tracking signal is generated based on the phase correction value, and a source signal received from a target satellite using the antenna assembly to generate the antenna sum signal and to generate the antenna difference signal.

15. The system of claim 14, wherein the tracking receiver is attached to the antenna assembly such that the tracking receiver moves with the antenna assembly.

16. The system of claim 12, wherein:
the antenna assembly has a feed assembly and a reflector; and
the tracking receiver is housed within a can of the feed assembly.

17. The system of claim 12, wherein the DSP is further configured to store a phase correction value associated with a phase difference between a first signal path through the antenna assembly to the sum output and a second signal path through the antenna assembly to the difference output.

18. A method, comprising:
receiving, at a sum input of a tracking receiver, a first calibration signal from an calibration output of the tracking receiver;
receiving, at a difference input of the tracking receiver, a second calibration signal from the calibration output;
converting the first calibration signal into a sum digital signal;
converting the second calibration signal into a difference digital signal; and
generating a phase correction value corresponding to a phase difference between the sum digital signal and the difference digital signal.

19. The method of claim 18, wherein:
the sum input is coupled to a sum output of an antenna assembly; and
the difference input is coupled to a difference output of the antenna assembly.

20. The method of claim 19, wherein the antenna assembly comprises:
a data antenna that generates a sum signal at the sum output; and
an offset antenna that generates a difference signal at the difference output.

21. The method of claim 19, wherein the antenna assembly comprises:
a TE21 coupler that generates a sum signal at the sum output and a difference signal at the difference output.

22. The method of claim 18, further comprising:
generating a tracking signal based on the phase correction value, and a source signal received from a target satellite using an antenna assembly to generate an antenna sum signal and an antenna difference signal.

23. The method of claim 22, wherein the tracking receiver is attached to the antenna assembly such that the tracking receiver moves with the antenna assembly in response to the tracking signal.

24. The method of claim 23, wherein:
the antenna assembly has a feed assembly and a reflector; and
the tracking receiver is housed within a can of the feed assembly.

25. The method of claim 18, wherein:
a first calibration signal insertion component couples the first calibration signal between the calibration output and the sum input, and defines a first signal path between the first calibration signal insertion component and the sum input; and
a second calibration signal insertion component couples the second calibration signal between the calibration output and the difference input, and defining a second signal path between the second calibration signal insertion component and the sum input.

26. The method of claim 25, wherein the phase correction value is based on a phase difference between the first signal path and the second signal path.

27. The method of claim 25, wherein:
the first calibration signal insertion component comprises a first coupler; and
the second calibration signal insertion component comprises a second coupler.

28. The method of claim 25, wherein:
the first calibration signal insertion component comprises a first switch; and
the second calibration signal insertion component comprises a second switch.

\* \* \* \* \*